United States Patent [19]
Coyne et al.

[11] Patent Number: 5,490,436
[45] Date of Patent: Feb. 13, 1996

[54] LIQUID-CHAMBER APPARATUS FOR ACTIVE, DYNAMIC BALANCING OF ROTATING MACHINERY

[75] Inventors: James C. Coyne, New Providence; Richard T. LaGrotta, West Orange; Frank A. Magnotti; Frances Turbiak-Magnotti, both of Millburn, all of N.J.

[73] Assignee: AT&T Corp., Murray Hill, N.J.

[21] Appl. No.: 214,728

[22] Filed: Mar. 17, 1994

[51] Int. Cl.⁶ .............................. G05G 1/00; F16F 15/22; F16F 15/10
[52] U.S. Cl. .......................... 74/573 F; 74/572; 74/573 R; 74/574
[58] Field of Search .................. 74/572, 573 R, 74/573 F, 574; 51/169; 417/423.14; 340/825.06; 364/463

[56] References Cited

U.S. PATENT DOCUMENTS

| | | | |
|---|---|---|---|
| 3,812,724 | 5/1974 | Curtz et al. | 74/573 F |
| 3,830,109 | 8/1974 | Litvinovich et al. | 73/455 |
| 4,002,086 | 1/1977 | Reinhall | 74/573 F |
| 4,003,265 | 1/1977 | Craig et al. | 74/573 R |
| 4,128,548 | 5/1990 | Lulay | 74/573 F |
| 4,295,387 | 10/1981 | Zhivotov et al. | 74/573 F |
| 4,537,177 | 8/1985 | Steere et al. | 51/169 X |
| 4,625,509 | 12/1986 | Sheppard | 74/573 F X |
| 4,684,944 | 8/1987 | Kerlin | 340/825.06 |
| 4,886,430 | 12/1989 | Veronesi et al. | 417/423.14 |
| 4,905,419 | 3/1990 | Makarov et al. | 51/169 |
| 4,919,646 | 4/1990 | Perdriat | 494/1 |
| 4,991,247 | 2/1991 | Castwell et al. | 74/573 F X |
| 5,007,303 | 4/1991 | Okuzumi | 74/573 F |
| 5,058,452 | 10/1991 | El-Shafei | 74/573 F |
| 5,086,664 | 2/1992 | Wagner | 74/572 |
| 5,099,430 | 3/1992 | Hirsch | 73/469 X |
| 5,197,010 | 3/1993 | Andersson | 73/457 X |

FOREIGN PATENT DOCUMENTS

| | | | |
|---|---|---|---|
| 5-18866 | 1/1993 | Japan | 74/573 F |
| 5-65942 | 3/1993 | Japan | 74/573 F |
| 5-272592 | 10/1993 | Japan | 74/573 F |
| 1578545 | 7/1990 | U.S.S.R. | 74/573 F |
| 1716347 | 2/1992 | U.S.S.R. | 74/573 F |
| WO9212797 | 6/1992 | WIPO | 74/573 R |

*Primary Examiner*—Vinh T. Luong
*Attorney, Agent, or Firm*—Martin I. Finston

[57] ABSTRACT

Apparatus performs active, dynamic balancing of a rotating machine by shifting the spatial distribution of an inertial liquid within a body that co-rotates with the rotating shaft of the machine. The body includes chambers, substantially disposed at equal angular intervals, for containing the inertial liquid. The chambers communicate through a channel lying at or beyond the outermost radial position of the outward ends of the chambers. A motive element or elements are provided for impelling the inertial liquid through the channel. The chambers, channel, and motive elements form a sealable system.

10 Claims, 6 Drawing Sheets

LIQUID-CHAMBER APPARATUS FOR ACTIVE, DYNAMIC BALANCING OF ROTATING MACHINERY

FIELD OF THE INVENTION

This invention relates to apparatus in which inertial masses are actively shifted within a body rotating on a shaft in order to cancel rotational imbalances associated with the shaft and bodies co-rotating thereon. More particularly, the invention relates to apparatus in which the inertial mass is a liquid mass, and to apparatus in which the active shifting is performed in a feedback control loop that is responsive to imbalance-detecting sensors.

ART BACKGROUND

Mass unbalance in rotating machinery leads to machine vibrations that are synchronous with the rotational speed. These vibrations can lead to excessive wear and to unacceptable levels of noise. Typical imbalances in large, rotating machines are on the order of one inch-pound.

It is a common practice to balance a rotatable body by adjusting a distribution of moveable, inertial masses attached to the body. Once a body has been balanced in this fashion, however, it will generally remain in balance only for a limited range of rotational velocities. For example, a flexible shaft rotating at speeds above half of its first critical speed will generally assume significant deformations that add to the imbalance. This often poses problems in the operation of large turbines and turbogenerators. Machines of this kind are usually operated above their first critical speed. As a consequence, machines that are initially balanced at relatively low speeds may tend to vibrate excessively as they approach full operating speed.

The mass unbalance distributed along the length of a rotating body gives rise to a rotating force vector at each of the bearings that support the body. In general, the force vectors at respective bearings are not in phase. At each bearing, the rotating force vector is opposed by a rotating reaction force which may be transmitted to the bearing supports as noise and vibration.

The purpose of active, dynamic balancing is to shift an inertial mass to the appropriate radial eccentricity and angular position for cancelling the net mass unbalance. At the appropriate radial and angular distribution, the inertial mass will generate a rotating centrifugal force vector equal in magnitude and phase to the reaction force referred to above.

The inertial mass may comprise one or more rigid elements, or, alternatively, it may comprise an inertial liquid. Inertial liquids are particularly useful in this context because they can be redistributed without the need for complicated mechanical linkages.

Practitioners in this field have described the use of inertial liquids for balancing rotating machinery. For example, U.S. Pat. No. 5,197,010, issued to A.O. Andersson on Mar. 23, 1993, describes active, dynamic balancing apparatus in which hydraulic pressure is used to control the distribution of an inertial liquid within a rotor. The rotor contains symmetrically disposed cavities communicating, through ducts, to a hydraulic pressure source. Each cavity is sealed by an elastic bladder. The degree to which the bladder is distended by hydraulic pressure determines the liquid mass within the corresponding cavity.

Although such an arrangement may be useful at relatively low centrifugal accelerations, it is likely to encounter difficulties when the combination of liquid density, radial position, and rotational velocity leads to relatively high centrifugal pressures, i.e., pressures of about 2 MPa (300 psi) or more. At these pressures, the resilient force of conventional membrane materials is likely to be overwhelmed by the centrifugal pressure.

What practitioners in the field have hitherto failed to provide is an active, dynamic balancing apparatus in which inertial liquid can be shifted within a sealed system, and that does not depend upon the resilient properties of materials for controlling the inertial mass distribution.

SUMMARY OF THE INVENTION

I have provided such an apparatus. Accordingly, the invention, in a broad sense, involves apparatus for balancing a rotating machine that has a rotational axis and a rotatable shaft concentric with the axis. This apparatus includes sensors for detecting rotational imbalance while the shaft is rotating, and a source of a control signal that is generated in response to the output of the sensors.

The apparatus also includes a body that can be mounted on the shaft and made to co-rotate with the shaft. Formed in the body is a group of at least two interconnectable chambers for containing the inertial liquid. These chambers desirably have respective centroids that are disposed substantially at equal angular intervals around the rotational axis. In preferred embodiments, these chambers are symmetrically disposed relative to the rotational axis. Each of these chambers has a longitudinal axis oriented substantially radially relative to the rotational axis, and has an end, to be referred to as the "outer end", distal the rotational axis.

A channel is disposed within the body for transferring inertial liquid between the interconnectable chambers. This channel lies at least as far (in the radial direction) from the rotational axis as the outermost of the respective outer chamber ends.

Mounted within the body is a pump, or other motive means, for impelling inertial liquid through the channel in response to the control signal. Significantly, the pump (or other motive means), the channel, and the interconnectable chambers form a sealable system.

Each chamber is made in such a way that centrifugal force will tend to urge the inertial liquid within the chamber toward the outer end of that chamber, and

BRIEF DESCRIPTION OF THE DRAWINGS

FIGS. 4 and 5 are schematic, conceptual drawings depicting an exemplary arrangement for inductively coupling power and control signals into a balancing rotor, according to the invention in one embodiment. FIG. 4 corresponds to a section taken through, e.g., plane A—A of FIG. 1.

DETAILED DESCRIPTION

Most vibrations in rotating machinery stem from centrifugal forces exerted on eccentric, rotating mass distributions. For example, when the center of mass of a thin, shaft-mounted rotor is displaced from a rotational axis passing through the geometrical center of the rotor, rotation will generate a centrifugal force vector that rotates synchronously with the shaft. The reaction to this centrifugal force will be distributed among the bearings that support the shaft. These reaction forces are physically described as phasors, and they can be represented vectorially, because they have both phase and magnitude. These reaction forces can be summed vectorially over many thin sections of an arbitrary rotor to obtain the total reaction-force phasor at each bearing.

The mass imbalance of a stationary rotor is only one of several sources of rotational imbalance. For example, the bearings will generally exhibit a small amount of clearance around the rotating shaft, and the oil filling that clearance will exhibit some mechanical compliance. Moreover, the bearing mounts, the equipment support structures, and the shaft will not be infinitely stiff, but will instead exhibit some flexing during operation of the rotating machine. The contributions to rotational imbalance due to such flexing will be especially significant when the shaft is rotated near the critical speeds.

Figure 1:
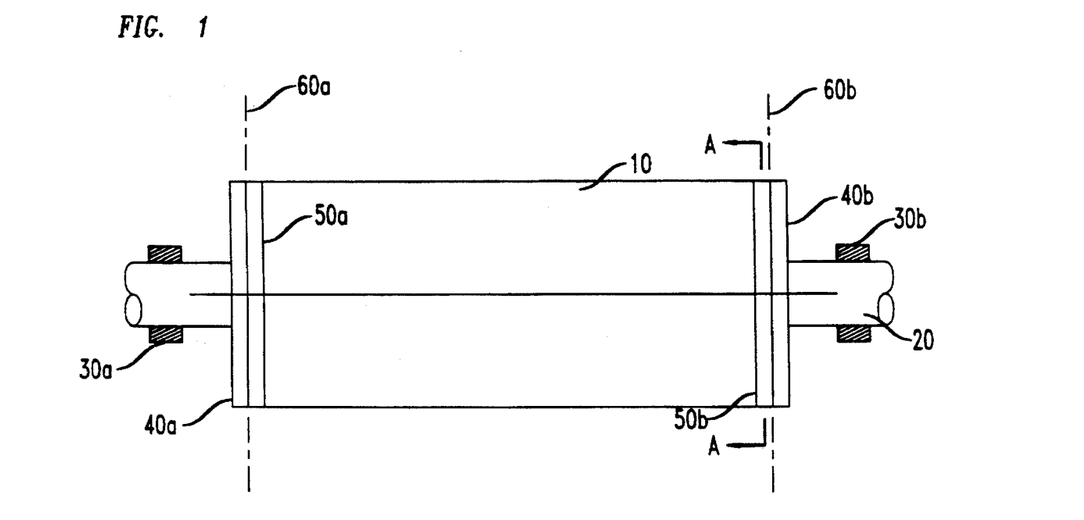
FIG. 1 is a schematic drawing of the main rotor portion of a rotating machine. Shown mounted so as to co-rotate with the main rotor are two pairs of balancing rotors. Each pair of balancing rotors is associated with a respective balancing plane.

Practioners in the art have long known that at least two balancing planes are required in order to dynamically balance any rotor of an axial length at least equal to its diameter. Accordingly, a preferred embodiment of the invention involves two balancing planes, as illustrated in FIG. 1.

As shown in the figure, main rotor 10 is mounted to shaft 20 and co-rotates therewith. The shaft is supported, in separate planes, on bearings 30a and 30b, respectively. A pair of balancing rotors 40a, 50a is provided for dynamic balancing in plane 60a, and a second pair of balancing rotors 40b, 50b is provided for dynamic balancing in plane 60b. These balancing rotors will be described in detail below.

The imbalance in the combined rotating system of the main and balancing rotors creates imbalance force phasors $\vec{U}_1$ and $\vec{U}_2$ in balancing planes 60a and 60b, respectively. The imbalance forces lead to vibrations $\vec{V}_a$ and $\vec{V}_b$ in bearings 30a and 30b, respectively. The frequency of the vibrations of interest is equal to the rotational frequency of the shaft.

The imbalance force phasors and the resulting vibrations are related through the open-loop transfer matrix M according to:

$$\begin{pmatrix} \vec{V}_a \\ \vec{V}_b \end{pmatrix} = \begin{pmatrix} \vec{M}_{11} & \vec{M}_{12} \\ \vec{M}_{21} & \vec{M}_{22} \end{pmatrix} \begin{pmatrix} \vec{U}_1 \\ \vec{U}_2 \end{pmatrix}.$$

Dynamic balancing is achieved by shifting the effective radius and angular orientation of corrective masses in planes 60a and 60b, leading to balancing force phasors $\vec{B}_1$ and $\vec{B}_2$, respectively. When the rotating system is perfectly balanced, $\vec{B}_1 + \vec{U}_1$ will sum to zero, and $\vec{B}_2 + \vec{U}_2$ will simultaneously sum to zero.

In active dynamic balancing, the values of $\vec{B}_1$ and $\vec{B}_2$ are periodically updated according to a feedback algorithm embodying the following updating step:

$$\begin{pmatrix} \vec{B}_{1,new} \\ \vec{B}_{2,new} \end{pmatrix} = \begin{pmatrix} \vec{B}_{1,old} \\ \vec{B}_{2,old} \end{pmatrix} + \beta N \begin{pmatrix} \vec{V}_a \\ \vec{V}_b \end{pmatrix},$$

where the matrix N is the inverse of M, and $\beta$ is a step-size multiplier having a scalar value less than unity.

Initial estimates of the elements of M (or N) may be made, for example, in the course of a crude balancing procedure using manually adjusted balancing weights. This estimate can be improved during operation of the rotating machine, and the resulting values periodically updated, by a procedure to be described below.

It should be noted that in general, the elements of M will tend to change over time, and they will tend to change as the operating conditions change. Because these changes will ordinarily be small relative to the changes in $\vec{U}_1$ and $\vec{U}_2$, it will be sufficient in at least some applications to treat M as constant or quasiconstant. However, for more demanding applications, it will be desirable to provide, in the feedback algorithm, periodic updates to the elements of M.

As noted, an automatic or semi-automatic procedure is available for updating the elements of M during operation of the rotating machine and the balancing rotor. Write M as a 4×4 matrix:

$$M = \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix},$$

write:

$$\begin{bmatrix} \vec{B}_1 \\ \vec{B}_2 \end{bmatrix} = \begin{bmatrix} B_1 \\ B_2 \\ B_3 \\ B_4 \end{bmatrix},$$

and write:

$$\begin{bmatrix} \vec{V}_a \\ \vec{V}_b \end{bmatrix} = \begin{bmatrix} V_1 \\ V_2 \\ V_3 \\ V_4 \end{bmatrix}.$$

Then each element of the matrix M satisfies the relation $$M_{ij} = \frac{dV_i}{dB_j}, \quad i,j = 1, \ldots, 4.$$

For each j, the coefficients $M_{ij}$, i=1, . . . , 4 are readily evaluated by effecting a small change in the balance-force component $B_j$, and measuring the resulting changes in the vibration components $V_1$, $V_2$, $V_3$, $V_4$.

Figure 2:
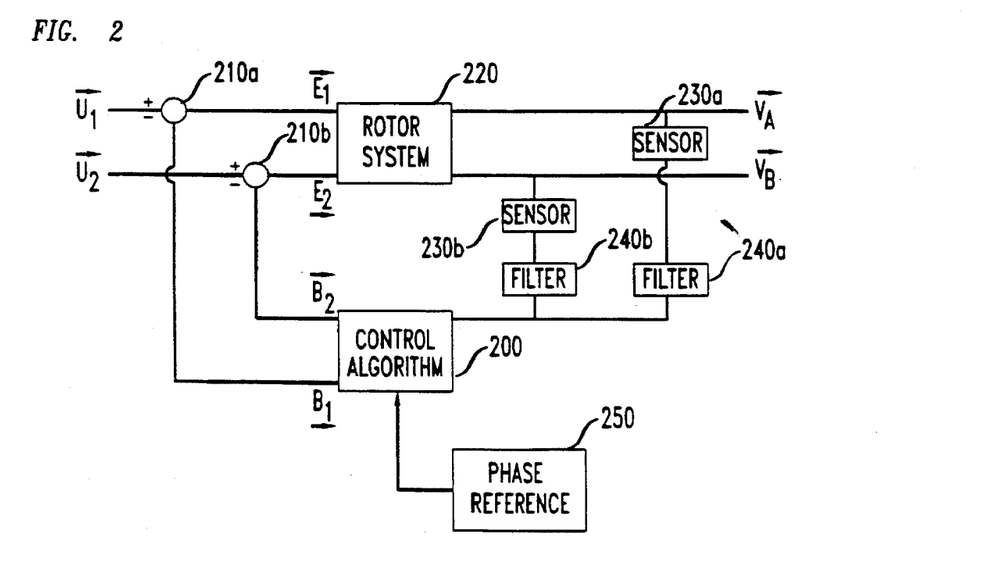
FIG. 2 is a schematic, conceptual drawing of a control system for active, dynamic balancing of a rotating machine according to the invention.

In the exemplary control system of FIG. 2, signal processing device 200 generates control signals that interact with the balancing rotors to produce the balancing vectors. The summation of the balancing vectors and the imbalance force phasors is represented conceptually at summing points 210a and 210b. These summations result in error signals $\vec{E}_1$ and $\vec{E}_2$, respectively. Ideally, vibration vanishes when the error signals are both zero. In response to finite error signals, vibrations $\vec{V}_a$ and $\vec{V}_b$ are generated by rotor system 220. Sensors 230a, 230b detect these vibrations and convert them to useable signals, such as electrical signals. Filters 240a, 240b remove from these signals all frequency components except components at the rotational frequency of the rotor system. The filtered signals are input to signal processor 200 as feedback information.

Each of the vibrations $\vec{V}_1$ and $\vec{V}_b$ has both magnitude and phase. If the filtered signals from sensors 230a and 230b contain only magnitude information, a separate source 250 of phase information (relative to a reference phase) is needed to provide input to the signal processor. Alternatively, an orthogonal pair of vibration sensors can be employed at each sensor location. One of these sensors detects a vibration component in a direction that may be denoted "vertical," and the other detects a vibration component in a corresponding "horizontal" direction. The four vibration components $V_1$, $V_2$, $V_3$, and $V_4$ may be obtained directly from such orthogonal sensor pairs. In such a case, there is no need for a separate phase input 250.

The balancing vectors are generated by shifting inertial masses in balancing rotors such as rotors 40a and 50a, or rotors 40b and 50b, of FIG. 1. Because balancing vectors can be added vectorially, it will often be desirable to provide, in each balancing plane, sources for two, mutually perpendicular, balancing vectors. Each of these vectors can be independently varied in magnitude from zero to some maximum quantity $B_{max}$ (which will generally be the same for both vectors) in both a positive and a negative sense. The resultant of these two vectors will then be variable in phase over a full range of $2\pi$ radians, and will be variable in magnitude from 0 to at least $B_{max}$ over this entire range. Such a mutually perpendicular pair of sources is represented by balancing rotors 300a and 300b of FIG. 3, shown mounted on shaft 20.

Figure 3:
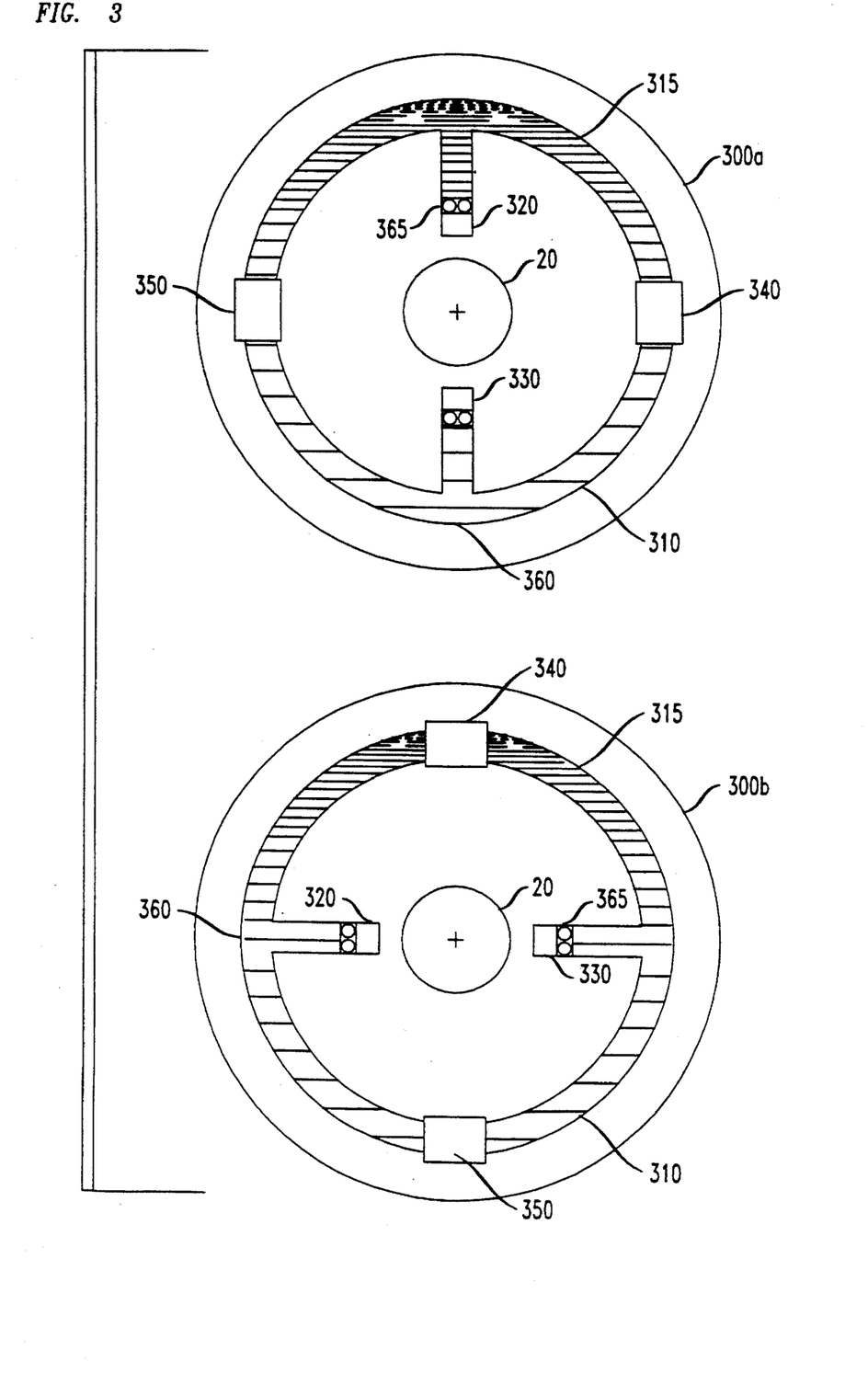
FIG. 3 is a schematic drawing of an exemplary pair of balancing rotors according to the invention in one embodiment.

A currently preferred inertial mass is provided in the form of an inertial liquid 310, as depicted in FIG. 3. In operation, this liquid fills a channel 315, and at least partially fills one or both of chambers 320 and 330. The chambers are interconnected by the channel, and by at least one pump 340. All redistribution of mass between the chambers is controlled by the pump (or pumps). In order to avoid fluid cavitation, it is desirable to dispose the pumps and interconnecting channels and conduits at radial distances greater than the chambers. For example, it will in at least some cases be convenient to dispose channel 315 substantially along a circumferential arc that lies at a greater radius (from the rotational axis) than the chambers.

It should be noted that although FIG. 3 depicts the channel as fully circular, in fact a semicircular channel will in at least some cases suffice to interconnect two diametrically opposed chambers. Component 350 is either an optional, second pump, or a dummy mass for at least approximately counterbalancing pump 340. If two pumps are used, it may be convenient to use one pump for shifting liquid from chamber 320 to chamber 330, and to use the other pump for shifting liquid in the opposite direction.

The chambers are exemplarily shaped, in cross section, with a longer dimension extending radially, and a shorter dimension transverse thereto. Each chamber desirably communicates with the channel through its outer end 360. As a consequence, centrifugal force will tend to force liquid out of the chambers and into the channel. As a further consequence, the pump will be required to work against centrifugal force whenever it operates to increase the difference between the fill depths of the two chambers.

A bladder or piston 365 is advantageously included within each chamber to prevent the inertial liquid from mixing with residual air (or other gas) within the chamber, and potentially causing air lock. This bladder or piston will press against the liquid surface with a resilient force. However, this force will not, in general, be useful for impelling the inertial liquid. Therefore, it will generally suffice if the pressure exerted by the bladder or piston is only a small fraction of the pump pressure.

It is desirable for the channel, chambers, and pump in each of the respective balancing rotors to form a sealable system with respect to the inertial liquid.

It will be appreciated that a balancing rotor of the kind described here can be made with three or more interconnected liquid chambers. In such arrangements, the chambers will typically be symmetrically disposed relative to the rotational axis. If more than two such chambers are included, it may be possible to use a single balancing rotor at each balancing plane. According to our current belief, the use of two pairs of diametrically opposed chambers at each balancing plane offers the optimal combination of: a) control over the balancing force, and b) mechanical simplicity. These two pairs may be situated in a single rotor, or in two adjacent rotors.

Figure 4:
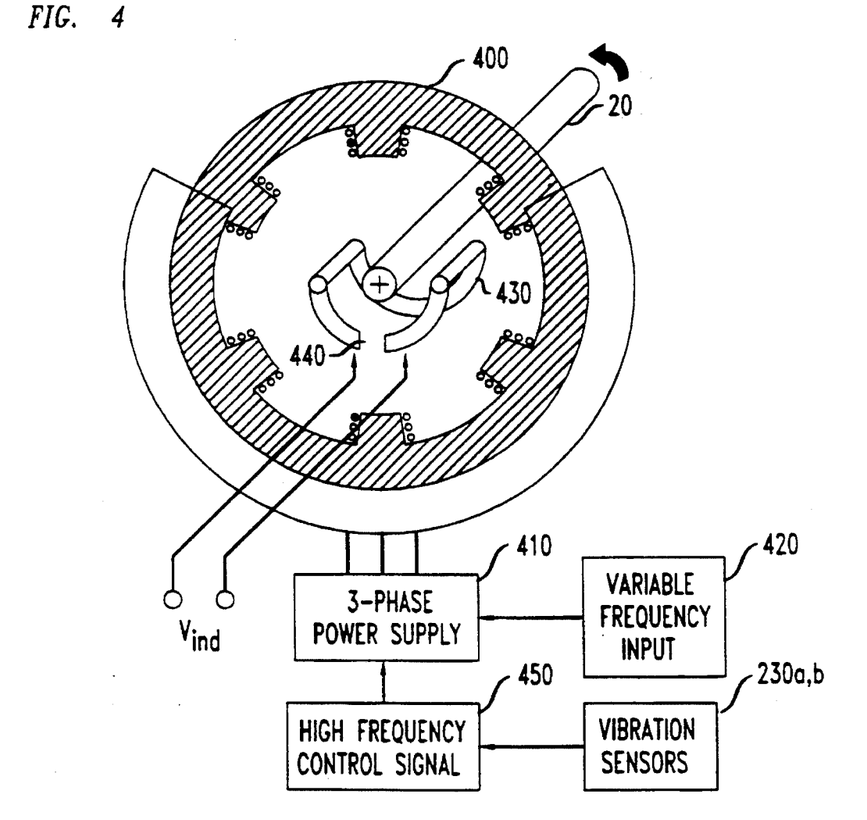

One possible power-coupling arrangement, depicted in FIG. 4, includes a three-phase, wye-connected stator winding 400 that is stationary relative to the machine support structures, and that surrounds a portion of shaft 20 and at least a portion of the balancing rotor (not shown). When the stator winding is powered from three-phase power supply 410, magnetic flux is produced within the space enclosed by the winding. This magnetic flux may be described by a magnetic field vector that rotates about the machine rotational axis with a rotational frequency determined by the frequency of the alternating current that powers the stator winding. This frequency is determined, in turn, by variable frequency signal generator 420.

Within, and co-rotating with, the balancing rotor is armature 430. The amount of magnetic flux, generated by stator winding 400, that threads armature 430 will vary according to the relative orientations of the armature and the magnetic flux vector. As a consequence, an alternative electromotive force, $V_{ind}$, will be induced across gap 440 whenever the rotational frequency of the magnetic flux vector differs from the rotational frequency of the shaft (together with the balancing rotor and the armature).

Variable frequency input 420 is readily adjusted to provide the right amount of slip (i.e., difference in rotational frequency) for generating a suitable value of $V_{ind}$ for powering the pump. If the pump is of a kind that is powered by direct current, suitable rectifying and filtering components for power conditioning are readily included within the balancing rotor.

Figure 5:
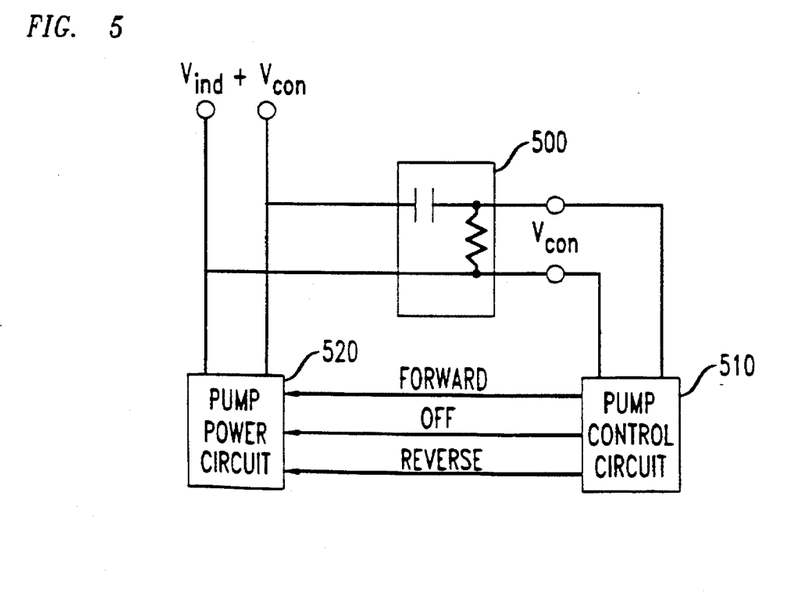

As noted, above, a signal processor exerts control over the pump in response to signals from vibration sensors 230a, 230b. One convenient method for coupling the (stationary)

signal processor to the (rotating) pump is now described with reference to FIGS. 4 and 5. A signal generator 450, responsive to the signals from the vibration sensors, superimposes on the three-phase current in the stator winding a control signal $V_{con}$. This signal has a frequency that is higher than the frequency of $V_{ind}$ and readily separated therefrom by high-pass filter 500. The signal $V_{con}$ passes to pump control circuit 510, which co-rotates with the pump. The electromotive force $V_{ind}$ passes to pump power circuit 520, which also co-rotates with the pump. In response to $V_{con}$, pump control circuit 510 produces electrical signals that act directly on the operation of the pump by, for example, turning the pump on in a forward direction, turning the pump on in a reverse direction, and turning the pump off.

It should be noted that other methods for coupling power and control signals can also be used. For example, a currently preferred method, to be described in detail below, uses a stationary stator field and optical coupling of the control signals.

Figure 6:
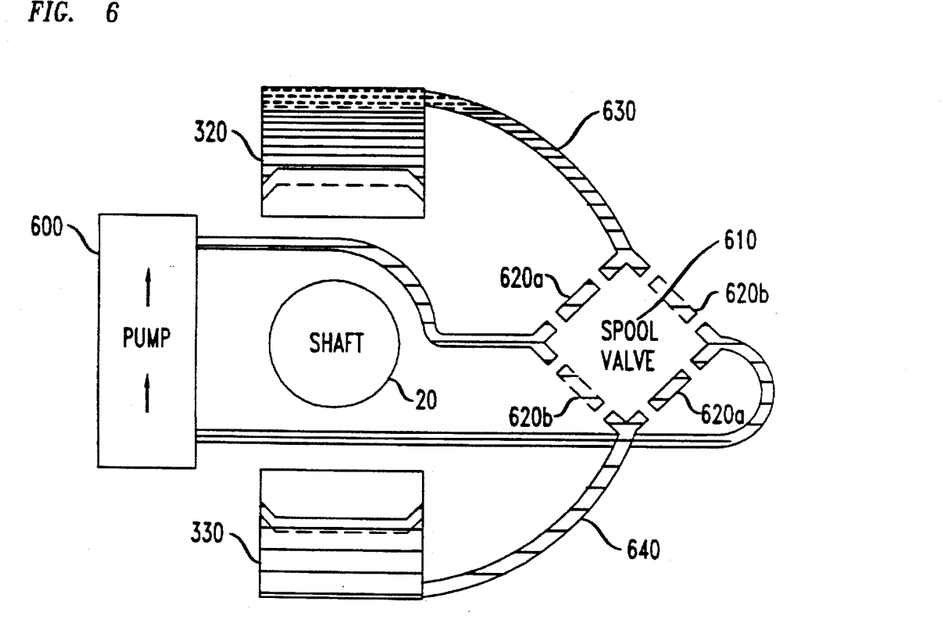
FIG. 6 is a schematic diagram representing a bidirectional pumping scheme that uses a unidirectional pump. Lines 690, 695 indicate a moved position of the liquid levels in the respective chambers.

Turning now to FIG. 6, a single, unidirectional pump 600 can be used in combination with spool valve 610 for bidirectional pumping between chambers 320 and 330. As shown in a schematic fashion in the figure, spool valve 610 provides alternate circulation paths 620A and 620B. When path 620A is made operative, the pump moves fluid from chamber 330 to chamber 320. When path 620B is made operative, the pump moves fluid in the opposite sense. As shown, the spool valve is advantageously situated on the opposite side of shaft 20, relative to pump 600. Fluid is advantageously conveyed between each chamber and the spool valve within a conduit 630, 640 substantially disposed along a circumferential arc.

A currently preferred pump is a positive displacement, piston pump. Pumps of the appropriate kind are conventionally used for metering; i.e., for moving precise volumes of liquid in specified time periods to provide accurate flow rates. I believe that pumps of this kind will readily move liquids at the typical pressures and viscosities that will be encountered in the field of machine balancing.

A currently preferred class of inertial liquids is the silicone oils, because these substances are generally chemically and thermally stable, have a stable viscosity and a high dielectric strength, and exhibit a high flash point. For example, DOW CORNING 200 Silicon oil has a specific gravity of 0.9 near room temperature, and a flash point of 600° F. At a rotational speed of 3600 rpm, a 6-inch difference in fluid levels between opposing chambers at a mean radius of 12 inches will generate a differential pressure of 795 psi. Commercially available piston metering pumps will readily pump this oil across such a pressure differential at a rate, typically, of 5 ml/minute while drawing about 10 watts of electric power at 115 VAC.

The reciprocating motions of the piston of the pump are preferably directed parallel to shaft 20, in order to avoid influencing the rotational balance of the machine. Similarly, the spool valve will typically operate by the motion of a piston having staggered through-holes for the enablement of one or the other of the alternate circulation paths. The motion of this piston should also be directed parallel to shaft 20.

Figure 7:
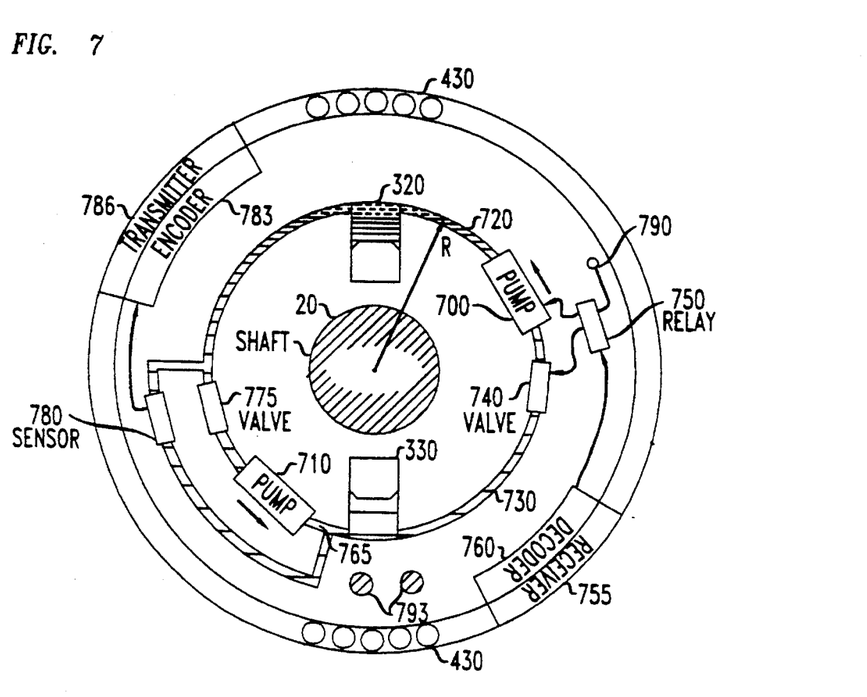
FIG. 7 is a schematic diagram of a balancing rotor according to a currently preferred embodiment of the invention. Although it is currently preferred to include two pump circuits, only one pump circuit is shown in this diagram, for clarity of presentation.

A currently preferred embodiment of the invention, using a pair of unidirectional pumps 700, 710, is now described with reference to FIG. 7. Each chamber 320, 330 has an outer end disposed at outer radius R. shown, pump 700 communicates directly with chamber 320 through conduit 720, and communicates with chamber 330 through conduit 730 and shut-off valve 740, which is exemplarily a solenoid-operated valve. The purpose of valve 740 is to prevent the inertial liquid from flowing through pump 700 from a higher pressure in chamber 330 to a lower pressure in chamber 320 when pump 700 is idle. The state of pump 700, i.e., whether it is idle or actively pumping, is determined by electrical power input to the pump from power relay 750. This relay, in turn, is responsive to control signals from receiver 755 and decoder 760, to be described in more detail below. When relay 750 changes the state of pump 700 from active to idle, a second power circuit from the relay activates valve 740 and thus cuts off liquid flow through conduit 730.

In analogous fashion, pump 710 communicates directly with chamber 330 through conduit 765, and with chamber 320 through conduit 770 and shut-off valve 775. The power input to pump 710 and valve 775 are controlled by relay 750. (For simplicity, these power connections have been omitted from the figure.)

Conduits 720, 730, 765, and 770 are exemplarily disposed along circumferential arcs.

Differential pressure sensor 780 is provided to sense the difference between the liquid pressures at the bottom (i.e., at the radially outermost level) of, respectively, chamber 320 and chamber 330. This pressure difference is a measure of the difference in liquid depth between the respective chambers. This information is transmitted to encoder 783, where it is converted to a logical signal appropriate for driving transmitter 786.

Electrical power to relay 750 is input, by way of electrical connection 790, from armature windings 430. Cavities 793 are provided within the body of the balancing rotor for crude balancing. These cavities are exemplarily bored in a direction parallel to shaft 20 and tapped for the insertion of threaded balancing masses.

Figure 8:
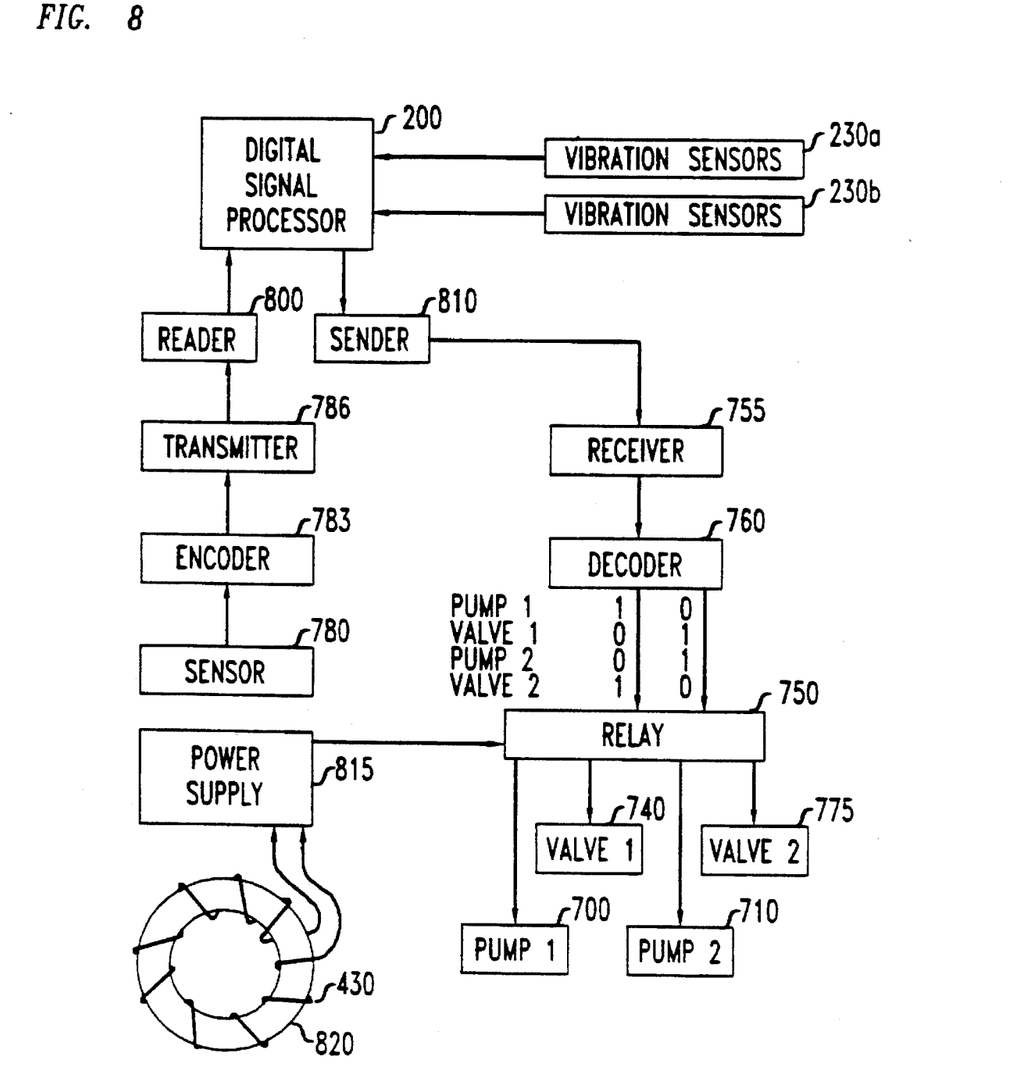
FIG. 8 is a block diagram showing the flow of information, control, and electric power in the balancing rotor of FIG. 7.

The power and control connections are now described further, with reference to FIG. 8. Vibration sensors 230A, 230B, digital signal processor 200, reader 800, and sender 810 are fixed with respect to the machine supports, and the the other components shown in the figure co-rotate with shaft 20 (not shown). The control algorithm implemented by processor 200 takes into account the vibration signals from sensors 230A and 230B, as discussed above, and also takes into account the current value of the differential pressure detected by sensor 780. As noted, encoder 783 drives transmitter 786 in response to this signal. Transmitter 786, which is rotating, is adapted to transmit the pressure signal across an air gap to fixed reader 800 as the transmitter flies past the reader. Exemplarily, transmitter 786 includes a bank of light-emitting diodes for transmitting the signal in parallel form across the air gap, and reader 800 includes a bank of photodetectors for receiving the signal.

The output of the control algorithm includes periodic instructions to activate either pump 700 (represented in the figure as Pump 1 ) or pump 710 (represented as Pump 2), and to activate the shut-off valve belonging to whichever pump is idle. These digitally coded instructions are transmitted across the air gap by sender 810, and received by receiver 755. Like the pressure signals, these instructions are exemplarily transmitted in parallel, optical form.

As noted, armature windings 430 provide electrical power. This electrical power may be conditioned for providing regulated output voltages by power supply 815. A particularly simple form for armature 430 is a helical coil wound on a ferromagnetic core 820. A stator can be provided having pole pieces appropriately arranged such that a magnetic field will thread this winding in a periodic fashion during the rotation of the armature, and will in that way induce an electromotive force. Accordingly, armature 430 has been represented in the figure as such a helical winding.

Figure 9:
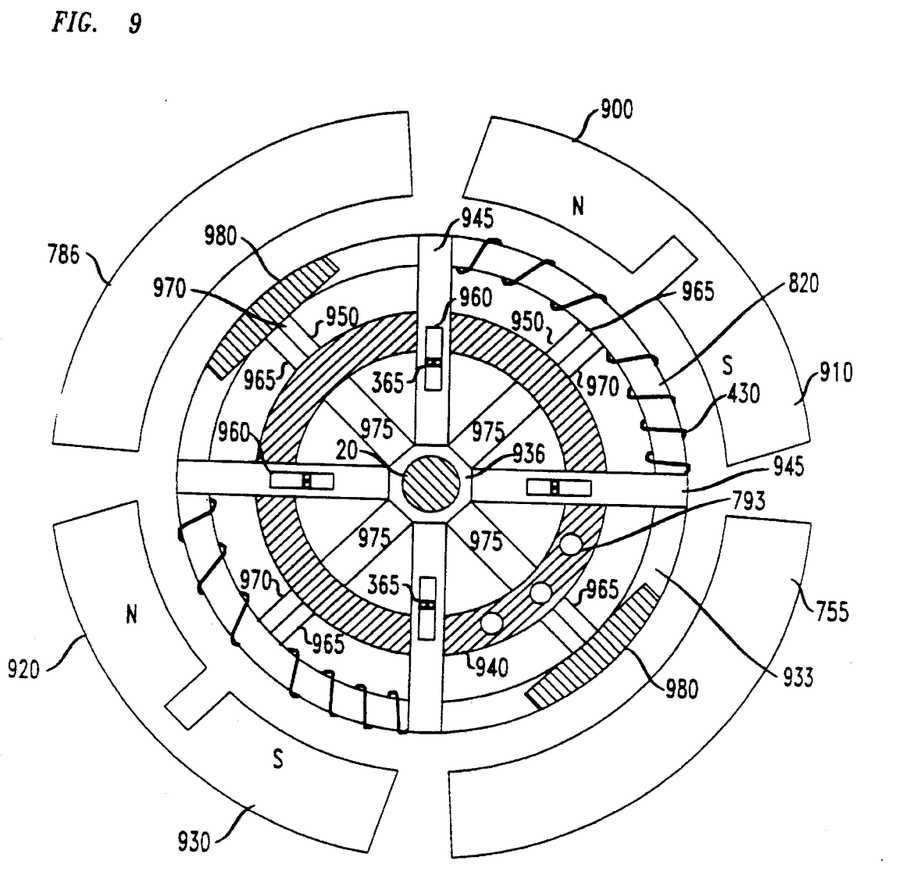
FIG. 9 is a diagram showing, in partially schematic form, an exemplary layout for the balancing rotor of FIG. 7.

For example, FIG. 9 shows a north-south pair of static pole pieces 900, 910, and diametrically opposite them, a second such pair 920, 930. Core 820 is exemplarily a shell of ferromagnetic material on outer ring structure 933, and armature 430 is an insulated copper winding.

The balancing rotor of FIG. 9 is a currently preferred embodiment in which two, mutually orthogonal pairs of liquid chambers are provided in a single balancing rotor, rather than in a rotor pair. This configuration is desirable because it is economical in its use of distance along the rotational shaft. (The direction parallel to the rotational shaft will be referred to as the "axial" direction.) That is, each pump will typically take up an axial distance at least equal to the stroke length of the pump piston. If separate balancing rotors are used, that distance will be doubled. However, if all of the pumps arc installed on a single rotor, such doubling is avoided. Additionally, this configuration permits the use of a single inductive power circuit to power both pump circuits.

Accordingly, the balancing rotor of FIG. 9 includes two independent pump circuits, each of which includes two unidirectional pumps and two liquid chambers. In this configuration, each of the liquid chambers may extend a substantial axial distance, comparable, e.g., to the length of the piston stroke.

In addition to outer ring structure 933, the balancing rotor of FIG. 9 includes: hub 936; inner ring structure 940; a set of four liquid-containing radial structures 945; and a set of four hydraulic radial structures 950.

The hub is rigidly fastened and locked to shaft 20. The four radial structures 945 and the four radial structures 950 are rigidly fastened to the hub. In each set, the four radial structures are arranged at 90° intervals, with the liquid-containing structures 945 midway between the hydraulic structures 950. The inner and outer ring structures are both rigidly fastened to all eight radial structures.

Each radial structure 945 includes a liquid chamber 960, and a radially-disposed conduit (not shown) that runs from the bottom of the chamber to a circumferentially disposed conduit (not shown) in ring structure 940.

Each radial structure 950 includes a positive displacement pump 965, a shut-off valve 970, a radially disposed conduit (not shown) for liquid transfer, and a radially disposed conduit (not shown) for electrical wiring between the pump and valve and the corresponding power relay. One power relay 975 is provided for each pump circuit. Each relay 975 is installed in one of the radial structures 950.

Included in inner ring structure 940 are circumferentially disposed conduits for electrical wiring (not shown) and balancing cavities 793.

Outer ring structure 933 is divided into four quadrants, with one pair of opposing quadrants supporting the windings of armature 430, and the other pair of quadrants supporting electronic assemblies 980. Each assembly will typically include an encoder-transmitter pair and a receiver-decoder pair, as described in connection with FIGS. 7 and 8. Each assembly 980 will also include a differential pressure sensor (not shown) hydraulically connected to the corresponding pair of liquid chambers. Each assembly 980 will also include a power conditioning circuit (not shown) for receiving the induced electromotive force from the armature and converting it to a group of regulated voltages for operating the corresponding pumps, shut-off valves, differential pressure sensor, encoder-transmitter, and receiver-decoder.

We claim:

1. Apparatus for balancing a rotating machine, said machine having a rotational axis and further having a rotatable shaft concentric with the axis, the apparatus comprising:
    a) means for sensing rotational imbalance of the machine during rotation of the shaft;
    b) a signal processor for generating a control signal responsive to the sensing means, said processor physically separated from the shaft such that said processor does not co-rotate therewith;
    c) a body adapted to mount on the shaft and to co-rotate therewith;
    d) means, stationary relative to the signal processor, for transmitting the control signal;
    e) means, stationary relative to the body, for receiving the control signal;
    f) a first interconnectable group comprising at least first and second chambers formed within the body and having respective centroids disposed substantially at equal angular intervals around the rotational axis, wherein each of said chambers is adapted to contain a first inertial liquid, each of said chambers has a longitudinal axis oriented in a substantially radial direction relative to the rotational axis, each of said chambers has an outer end disposed distal the rotational axis, and each of said outer ends has a respective maximum radial distance from the rotational axis, said maximum distance to be referred to as the respective chamber outer radius;
    g) at least one first channel adapted for transferring at least a portion of said first inertial liquid between the chambers of the first interconnectable group, said channel disposed within the body and radially distant from the rotational axis by at least the greatest of the respective chamber outer radii; and
    h) first motive means, mounted within the body, for impelling at least a portion of said first inertial liquid through the first channel in response to the control signal received by the receiving means, wherein:
    i) the first interconnectable group of chambers, the first channel, and the first motive means form a first sealable system with respect to said first inertial liquid;
    j) each of the chambers is adapted such that under the action of centrifugal force, said first inertial liquid within the chamber is urged toward the outer end of that chamber, and
    k) the first channel is in receiving relationship to the chambers with respect to displacements of said first inertial fluid induced by centrifugal force.

2. Apparatus of claim 1, wherein the first interconnectable group of chambers consists of two diametrically opposed chambers.

3. Apparatus of claim 2, further comprising: a second interconnectable group of two diametrically opposed chambers formed within the body and disposed substantially at right angles to the first interconnectable group; at least one second channel adapted for transferring at least a portion of a second inertial liquid between the chambers of the second interconnectable group; and second motive means, mounted within the body, for impelling at least a portion of said second inertial liquid through the second channel in response to the control signal, wherein the second interconnectable group, the second channel, and the second motive means form a second sealable system, with respect to said second inertial liquid, that is isolable from the first sealable system.

4. Apparatus of claim 3, wherein the body comprises: a hub adapted to be rigidly fastened to the shaft; an inner ring surrounding and concentric with the hub; an outer ring surrounding and concentric with the inner ring; four radial arms, to be referred to as liquid-containing arms, projecting at 90-degree intervals from the hub and rigidly connected to the hub, the inner ring, and the outer ring; and four further radial arms, to be referred to as hydraulic arms, projecting at 90-degree intervals from the hub such that each said hydraulic arm is midway between two said liquid-containing arms, each of said hydraulic arms rigidly connected to the hub, the inner ring, and the outer ring, wherein:

a) the first and second motive means comprise at least first and second electric pumps disposed on respective, diametrically opposing said hydraulic arms;

b) each of the chambers is formed within a respective one of the liquid 13 containing arms such that each interconnectable group of chambers corresponds to two, diametrically opposing said liquid-containing arms; and c) each of said interconnectable groups is at least partly interconnected through a circumferentially disposed liquid conduit contained within the inner ring.

5. Apparatus of claim 4, wherein:

a) the first motive means comprise two electric pumps, each disposed within a respective one of the hydraulic arms; and b) the second motive means comprise two further electric pumps, each disposed within a respective one of the hydraulic arms different from the hydraulic arms in which the first motive means are disposed.

6. Apparatus of claim 1, wherein the first motive means comprise an electric pump.

7. Apparatus of claim 6, further comprising: means, external to the rotating machine, for producing magnetic lines of flux; means, adapted to co-rotate with the rotatable body, for intercepting the magnetic lines of flux in a time-varying fashion such that an electromotive force is generated in said intercepting means; and means for electrically connecting the intercepting means to the pump such that a path is provided for a flow of electric current responsive to the electromotive force, thereby to energize the pump.

8. Apparatus of claim 7, wherein the external flux-producing means comprise:

a) a three-phase, wye-connected stator winding;

b) a three-phase, variable-frequency, power supply electrically connected to the stator winding for producing an electric current therein; and c) means for varying the frequency of the three-phase power supply, relative to the rotational velocity of the shaft, such that a suitable electromotive force is generated for energizing the pump.

9. Apparatus of claim 6, wherein the electric pump comprises a piston for impelling at least a portion of said first inertial liquid, and the piston is oriented such as to undergo reciprocal motions in a direction parallel to the rotational axis.

10. Apparatus of claim 6, wherein the body comprises: a hub adapted to be rigidly fastened to the shaft; an inner ring surrounding and concentric with the hub; an outer ring surrounding and concentric with the inner ring; four radial arms, to be referred to as liquid-containing arms, projecting at 90-degree intervals from the hub and rigidly connected to the hub, the inner ring, and the outer ring; and four further radial arms, to be referred to as hydraulic arms, projecting at 90-degree intervals from the hub such that each said hydraulic and is midway between two said liquid-containing arms, each of said hydraulic arms rigidly connected to the hub, the inner ring, and the outer ring, wherein:

a) the first and second chambers are formed within two respective, diametrically opposing, said liquid-containing arms; and b) the first and second chambers are interconnected at least partly through a circumferentially disposed liquid conduit contained within the inner ring.

* * * * *